Oct. 14, 1958 W. H. HOGAN 2,856,179
SHOCK ABSORBER
Filed Nov. 22, 1954 5 Sheets-Sheet 1

INVENTOR.
WALTER H. HOGAN
BY
ATTORNEY

Oct. 14, 1958 W. H. HOGAN 2,856,179
SHOCK ABSORBER
Filed Nov. 22, 1954 5 Sheets-Sheet 2

INVENTOR.
WALTER H. HOGAN
BY
ATTORNEY

Oct. 14, 1958     W. H. HOGAN     2,856,179
SHOCK ABSORBER

Filed Nov. 22, 1954     5 Sheets-Sheet 3

INVENTOR.
WALTER H. HOGAN
BY
ATTORNEY

Oct. 14, 1958

W. H. HOGAN 2,856,179

SHOCK ABSORBER

Filed Nov. 22, 1954

INVENTOR.
WALTER H. HOGAN
BY
ATTORNEY

United States Patent Office

2,856,179
Patented Oct. 14, 1958

2,856,179

SHOCK ABSORBER

Walter H. Hogan, Olmsted Falls, Ohio, assignor to Cleveland Pneumatic Industries, Inc., Cleveland, Ohio, a corporation of Ohio Application November 22, 1954, Serial No. 470,372

4 Claims. (Cl. 267—9)

This invention relates to a new and improved shock absorber particularly adapted for use in aircraft installations.

Generally speaking, shock absorbers have utilized fluid that is compressed and caused to flow through restricted orifices which govern the rate of flow and control the operation of the shock absorber itself. In a shock absorber according to this invention, mechanical means are utilized to convert the relatively small axial motion of the shock absorber plunger or actuator into larger rotational motion of a rotating member to which controlling forces are applied. Since these controlling forces work through the mechanical advantage of the motion conversion, it is possible to control large actuating forces with relatively small controlling forces. Because of the mechanical simplicity of motion conversion and high efficiency of ball screws, it is contemplated that such a device be used for the motion converting phase of the invention. The control of the rotational motion according to this invention also contemplates new and improved energy absorbing means which may be combined and modified to achieve any desired operation.

It is an important object of this invention to provide a shock absorber utilizing mechanical motion multiplying means in combination with small motion resisting means which operate through large distances to control large forces operating through relatively short distances.

It is another object of this invention to provide a shock absorber including motion multiplying means wherein small reaction forces are capable of controlling large actuating forces.

It is another object of this invention to provide a shock absorber including motion multiplying means wherein friction means operating through a large distance are used to control large forces operating through a small distance.

It is another object of this invention to provide a shock absorber including motion multiplying means wherein friction means operating through a large distance resisting large forces acting through a small distance where the operation of the friction means is affected by the velocity of the action of the large force.

It is another object of this invention to provide a shock absorber wherein inertia of one of the elements is utilized to resist rapid accelerations of the shock absorber mechanism.

It is another object of this invention to provide a shock absorber including motion multiplying means wherein viscous damping means are utilized to control the operation of the shock absorber.

It is still another object of this invention to provide a shocker absorber wherein friction, viscous and inertia damping may be utilized either alone or in combination to control the operation of the shock absorber.

Further objects and advantages will appear from the following description and drawings, wherein.

Figure 1:
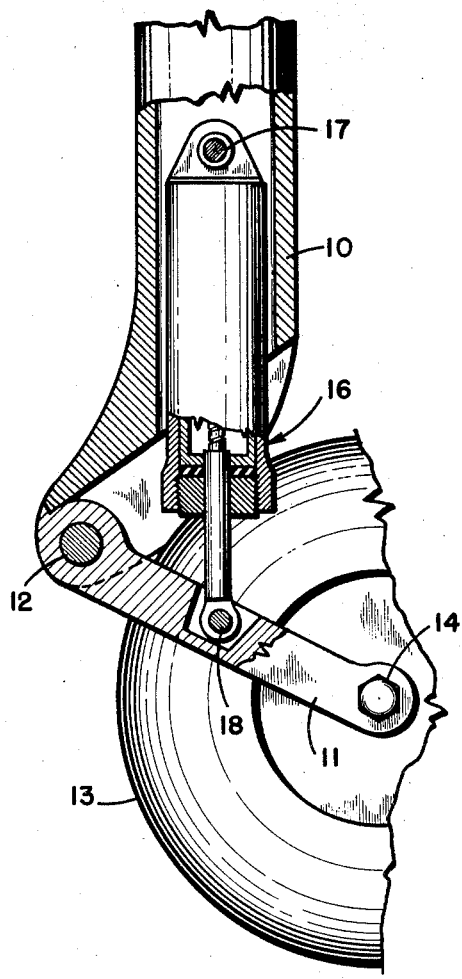
Figure 1 is a fragmentary section of a landing gear incorporating a shock absorber according to this invention.

The shock absorber according to this invention is particularly adapted for the use in aircraft landing gears. Figure 1 shows a representative type of installation which could be utilized wherein a landing gear strut 10 is provided with a laterally extending arm 11 pivoted to the strut 10 at 12. A wheel 13 is mounted on the other end of the arm 11 as at 14, and a shock absorber 16 incorporating this invention is pivoted on the strut 10 as at 17 and on the arm 11 as at 18 and provides means for controlling the rotation of the arm 11 around the pivot 12.

Figure 2:
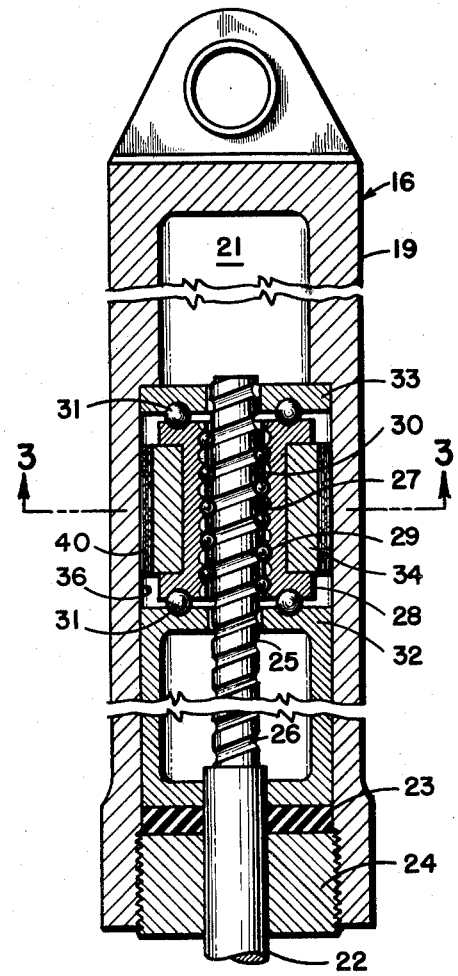
Figure 2 is a longitudinal section of one embodiment of this invention incorporating a liquid spring, inertia and friction damping.

Reference should be made to Figure 2 for the specific structure of the shock absorber 16 as shown in Figure 1. A housing 19 is provided with an axially extending cylindrical cavity 21 into which the shock absorber plunger 22 projects. A fluid seal 23 engages the outer surface of the plunger 22 and in cooperating with the seal retainer 24 provides a fluid seal between the plunger 22 and the housing 19 while permitting the plunger to move axially relative thereto. The inner end of the plunger 22 is formed with a screw portion 25 provided with a helical groove 26 which cooperates with annular grooves 27 formed in a nut 28 to define ball cavities where the grooves intersect in which balls 29 are positioned. A cylindrical cage 30, positioned between the nut 28 and the screw portion 25, is formed with apertures adapted to receive and properly position the balls at these intersections of the grooves 26 and 27 as the nut rotates relative to the screw. The nut 28 is thereby connected to the plunger 22 in such a manner that axial motion therebetween provides relative rotation between the members. Antifriction thrust bearings 31 engage the ends of the nut 28 and the thrust members 32 and 33 which in turn prevent the nut from moving axially relative to the housing 19. By providing such an antifriction ball screw it is possible to convert small axial motion of the plunger 22 into large rotational motion in the nut 28.

A plurality of rotationally fixed, radially movable brake shoes 34 are mounted on the nut 28 between the projections 35 which permit them to move radially but restrains them from angular movement relative to the nut. Each shoe 34 is provided with a lining 40 which is proportioned to engage the inner wall 36 of the housing 19 and resist rotation of the nut 28. The plunger 22 is rotationally fixed relative to the housing 19 by the pivots 17 and 18 on the strut 10 and the arm 11. It is, therefore, apparent that movement of the arm 11 relative to the strut 10 will cause the plunger 22 to move axially relative to the housing 19 which, due to the threaded connection between the screw 25 and the nut 28, causes the nut 28 to rotate relative to the housing 19. When the nut 28 is rotated, the brake shoes 34 are thrown out radially by a centrifugal force wherein the force is proportional to the square of the velocity of the nut 28. It is apparent, therefore, that the brake shoes 34 resist rotation of the nut 28 and in turn resist axial motion of the plunger 22 in both directions. Also, because the nut 28 and the brake shoes 34 necessarily have a mass which resists aceleration, rapid changes in velocity of the plunger 22 are resisted. This inertia of the rotating mass is utilized to effect an initial deflection in the tire of the landing gear and also to resist vibrational loads and rebound.

The entire cavity 21 within the housing 19 above the seal 23 in the preferred embodiment as shown in Figure 2 is filled with a liquid and in cooperating with the plunger 22 forms a liquid spring which is capable of assuming the static load on the shock absorber 16. The effective shock absorbing action of the shock absorber is a result of the combined effects of the inertia of the nut 28 and the brake shoes 34, the frictional resistance to rotation of the nut 28 and the resistance to axial motion of the plunger 22 due to compression of the liquid in the cavity 21.

In a normal aircraft landing, the shock absorber is fully extended prior to the impact with the ground. The first sizable reaction resisting motion of the plunger 22 is created by the inertia of the nut 28 and the brake shoes 34. This inertia resists acceleration of the nut and in turn motion of the plunger 22 until the nut 28 reaches a maximum rotational velocity which necessarily occurs early in the stroke. After the nut 28 has reached its maximum velocity, the inertia reaction approaches zero but at this time the centrifugal forces on the brake shoes 34 are at a maximum so the frictional resistance to rotation of the nut becomes the dominant reaction force. As the plunger 22 moves through its stroke against the reactions of the shock absorber, the velocity of the plunger decreases and the frictional resistance to rotation of the nut necessarily decreases. Inertia does not come into substantial play at this time; however, since the deceleration of the plunger 22 is substantially constant at a relatively low rate. As the reaction of the brake shoes decreases due to the deceleration of the plunger 22, the compression of the liquid within the cavity 21 is increased and, therefore, the reaction on the plunger 22 due to the compressed liquid increases. This continues until the shock absorber reaches an equilibrium and the load is carried entirely by the reaction of the liquid on the plunger 22. Since the tendency to overstroke and rebound is quite prevalent, the inertia of the nut 28 and the brake shoes 34 again comes into play at the end of the stroke damping the violence of the rebound.

From the above description it is apparent to those skilled in the art that the various reaction phenomena can be adjusted to give the shock absorber a relatively constant reaction force so that a highly efficient device results. Also, since the inertia of the nut 28 and the brake shoes 34 resists any sudden changes in acceleration, very effective vibration damping is achieved regardless of the position of the plunger 22 relative to the housing 19.

Figure 4:
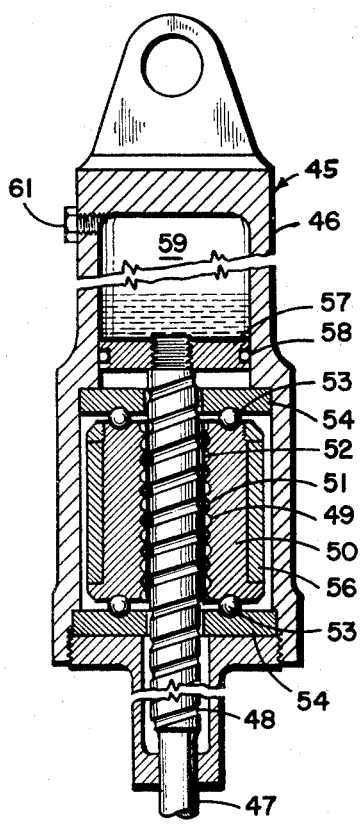
Figure 4 is a longitudinal section of a shock absorber according to this invention which provides a pneumatic spring and inertia damping.

In Figure 4 a shock absorber incorporating this invention is shown which is particularly well adapted for use on helicopters and the like. Difficulty has often been encountered in helicopters since the gear should be soft for landing but be relatively stiff in its resistance against vibrational loading. In some extreme cases resonance has occurred due to the vibration caused by the turning of the rotor which has been violent enough to tip over the helicopter.

In Figure 4 a shock absorber 45 is shown which comprises a hollow body 46 into which projects a plunger screw 47. The body 46 is adapted to be pivoted on the strut of the landing gear and the plunger screw 47 is adapted to be connected to any of the floating linkage of the strut in such manner that the load of the helicopter is assumed by the shock absorber. The screw 47 is formed with helical grooves 48 which cooperate with annular grooves 49 in a nut 50 to define ball cavities at their intersection in which balls 51 are positioned. A cage 52 is utilized to properly locate the balls 51 in their respective cavities. Antifriction thrust bearings 53 cooperate with thrust members 54 to prevent the nut 50 from moving axially of the body 46 while providing a mounting wherein the nut is free to rotate. This ball screw and nut structure is the same as above described in connection with Figure 1. Here again the ball bearing screw is utilized to convert relatively small axial motions of the screw 47 into large rotational motions of the nut 50. To increase the mass inertia of the nut 50, an annular ring 56 formed of a heavy metal is mounted on the nut 50. Mounted on the upper end of the screw 47 is a piston 57 provided with a seal 58 engaging the walls of a cylindrical chamber 59 in the body 46. In the preferred form liquid is located in the cylindrical chamber 59 above the piston 57 and is precharged with pressurized air through the charging device 61.

Figure 3:
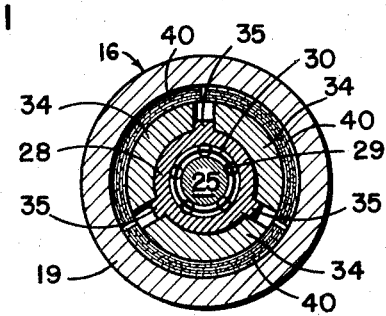
Figure 3 is a cross section taken on line 3—3 of Figure 2.

The operation of this shock absorber is somewhat different than the shock absorber shown in the Figures 2 and 3 since the velocity of the screw 47 as it moves upwardly relative to the body 46 does not in itself effect a reaction. The air spring above the piston 57 provides a reaction against motion of the screw 47 toward the body 46 but this reaction is only proportional to the axial position of the piston 57. However, any changes in the velocity of the screw 47 toward the body 46 will create large changes in the velocity of the nut 50 which, due to the inertia of the nut and annular ring 56, will create a reaction resisting the changes in velocity of the screw 47.

In a normal landing operation, the nut 50 must be accelerated to the maximum velocity and then returned to a stationary position after equilibrium is reached. Since this occurs only once, the inertia reaction does not affect the shock absorber to any great degree. If, however, vibration occurs which would tend to cause resonance to be set up, the inertia of the nut 50 and the ring 56 will provide a very strong resistance to such rapid movement. By utilizing the ball screw device to convert the small motion of the screw into large rotational motion in the nut, it is possible to greatly increase the mass inertia effect of the nut without utilizing particularly heavy nut structures.

Figure 5:
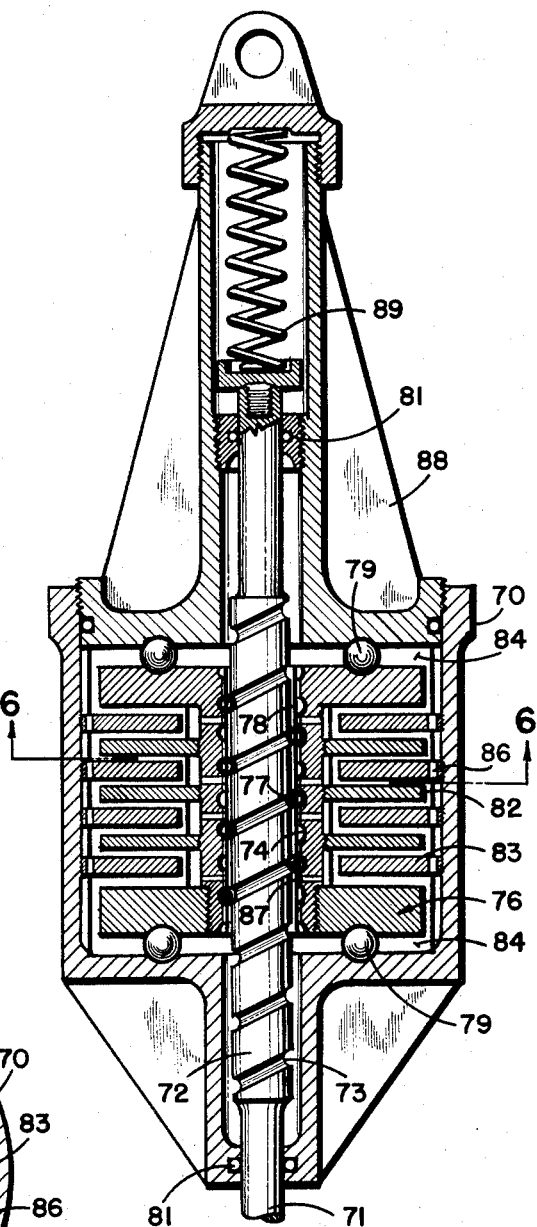
Figure 5 is a longitudinal section of a viscous shock absorber in combination with a mechanical spring.

Another form of this invention is shown in Figure 5 wherein the viscosity of a liquid, preferably oil, is utilized to resist the movement of the shock absorber. Here again a housing 70 is provided with a cavity into which a plunger 71 projects. The plunger 71 is provided with a grooved screw portion 72 having a helical groove 73 which cooperates with annular grooves 74 in a nut assembly 76 to define the usual ball cavities in which balls 77 are positioned. Here again a cage 78 is utilized to properly position the balls at the intersection of the grooves 73 and 74. Antifriction thrust bearings 79 axially locate the nut assembly 76 within the housing 70 without restraining the nut against rotation relative thereto. Fluid seals 81 engage the plunger 71 on either side of the screw portion 72 and in cooperation with the housing 70 retain oil in the area of the screw and nut. The nut assembly 76 is provided with a series of radially extending fins 82 interspaced with a similar series of radially extending fins 83 mounted on the housing 70. As the nut assembly 76 is rotated relative to the housing 70, the fins 82 rotate with the nut relative to the fins 83 which are fixed on the housing and provide a large surface subject to the viscous resistance of the oil within the cavity.

In the preferred form of this modified construction the spacing of the fins 82 and 83 is relatively small compared to the spaces 84 between the ends of the nut and the housing 70. The fins 83 are also provided with apertures 86 adjacent to their periphery which permits the flow of oil axially along the periphery to the spaces 84. The nut is also formed with a series of radial ports 87 which complete the circuit for the flow of oil. As the fins 82 rotate relative to the fins 83, a centrifugal type pumping results which causes a build up of pressure adjacent to the periphery of the fins 83. This build up of pressure causes the oil to flow axially through the apertures 86 to the spaces 84 and back into the fin area through the ports 87. This pumping of the oil serves two purposes in that it circulates the oil so that fresh oil is brought into the area of the viscous damping as well as providing circulation of the oil into engagement with the outer portion of the housing 70 so that it may be cooled. A plurality of cooling fins 88 are provided which augment the cooling operation.

Figure 6:
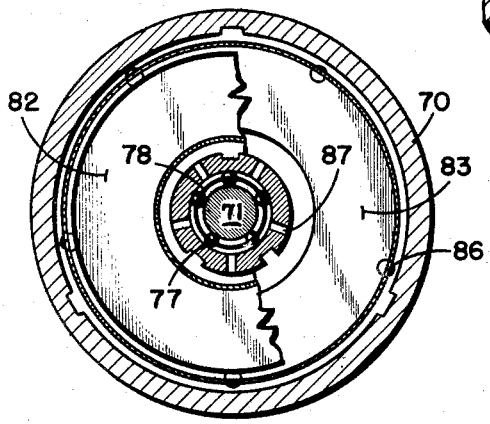
Figure 6 is a cross section taken on line 6—6 of the shock absorber shown in Figure 5.

In the shock absorber shown in Figures 5 and 6, the viscous damping is shown in combination with a mechanical spring 89 which engages the upper end of the plunger 71 and resists movement of the plunger into the housing 70. In this shock absorber the viscous damping is utilized to resist movement of the plunger 71 and the spring 89 is utilized to support static loads after the shock absorber has operated, of course, the spring 89 will provide a resistance to movement of the plunger 71 into the housing 70 but this resistance is not affected by the velocity of the movement. The viscous damping achieved by this shock absorber has desirable characteristics of being proportional to the velocity of the nut assembly 76 and in turn the plunger 71 so that as greater impacts occur greater resistance results. Here again the ball screw structure is utilized to convert relatively small axial motions into large rotational motions so that the effect of the viscous reaction will be large even though the reaction force itself may be small. It is, therefore, possible to utilize a relatively small viscous damper to control relatively large forces.

Figure 7:
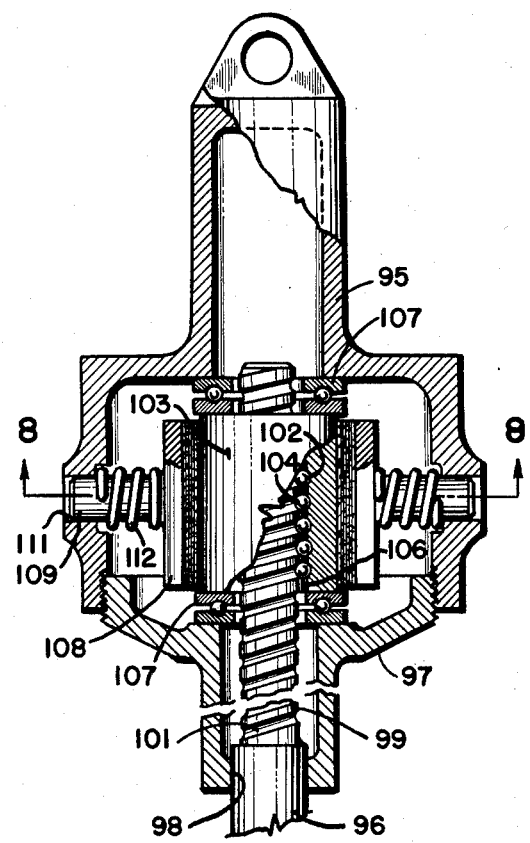
Figure 7 is a longitudinal section of a friction shock absorber wherein the frictional resistance to plunger movement is substantially constant.

In Figure 7 a shock absorber is shown wherein friction reaction force is utilized which is constant regardless of the velocity of operation. Here again a hollow body 95 is arranged to receive the end of a plunger 96. A cap member 97 is threaded into the end of the body 95 and provides a guide bearing 98 for the plunger 96. A screw portion 99 formed on the plunger 96 is provided with helical grooves 101 arranged to cooperate with annular grooves 102 formed in a nut 103 to define ball cavities adapted to receive balls 104. A cage 106 is utilized to properly position the balls 104 at the intersection of the grooves 101 and 102. Antifriction bearings 107 axially locate the nut 103 within the body 95 while permitting free rotation thereof so that axial motion of the plunger 96 relative to the body 95 and nut 103 will cause the nut 103 to rotate through a large distance in response to small plunger movements.

The outer surface of the nut 103 is preferably formed as a smooth cylinder and a plurality of movable brake shoes 108 are mounted in the body 95 for only radial motion relative thereto by means of a stub shaft 109 and apertures 111 in the body 95. Springs 112 engage the body 95 at one end and the brake shoes 108 at the other end and are arranged to urge the brake shoes into engagement with the outer surface of the nut 103. Since the brake shoes are preloaded by the springs 112 and do not rotate as the nut rotates, the frictional engagement between the brake shoes and the nut is constant regardless of the rotational velocity of the nut. It is, therefore, apparent in this shock absorber that the resisting reaction is constant regardless of the velocity of the plunger 96. However, here again a small resistance force operating through a large distance is utilized to control larger forces operating through small distances by virtue of the motion converting characteristics of the ball screw.

Figure 9:
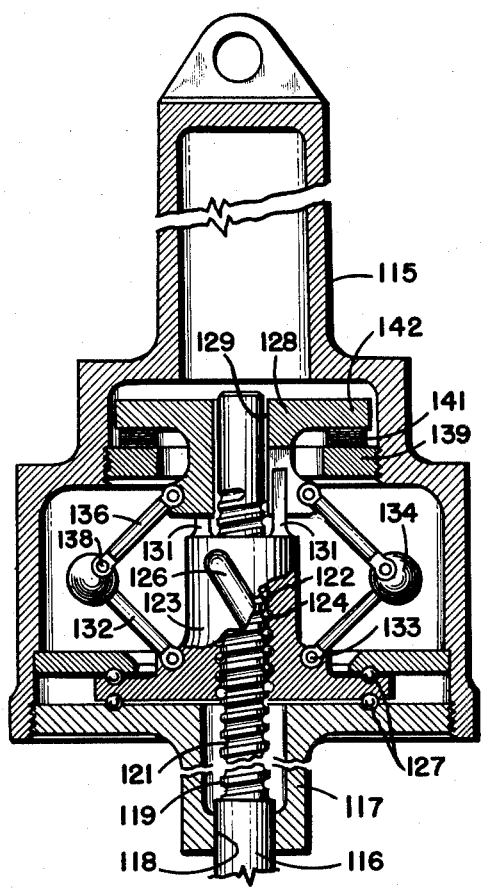
Figure 9 is a longitudinal section of another embodiment of the shock absorber according to this invention.
Figure 8:
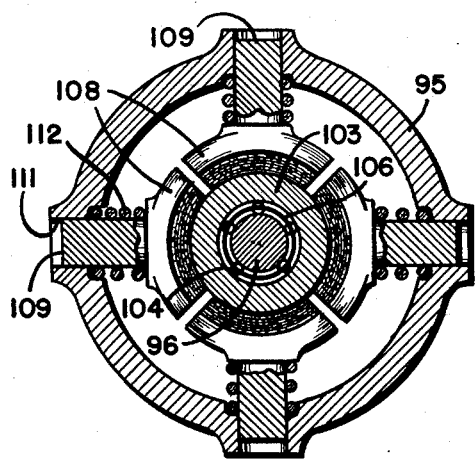
Figure 8 is a cross section taken on line 8—8 of the shock absorber shown in Figure 7.

In Figure 9 a modification of this invention is shown wherein the centrifugal forces caused by rotation are translated into an axial force. The shock absorber includes a hollow body 115 into which a plunger 116 projects. The cap 117 is threaded into the body 115 and is provided with a bearing 118 to axially guide the plunger 116. A screw portion 119 of the plunger 116 is provided with a helical groove 121 which cooperates with a helical groove 122 in a nut 123 to define a helical ball channel filled with balls 124. A return tube 126 is mounted on the nut 123 to convey the balls 124 between the ends of the nut thereby forming a closed circuit for the balls 124. Antifriction thrust bearings 127 are utilized to axially fix the nut 123 within the body 115 while providing free rotation therebetween. A friction member 128, provided with a clearance bore 129 adapted to loosely receive the end of the screw portion 119, is mounted for axial motion relative to the nut on the axially extending pins 131 while being restrained against rotational motion relative to the nut. A fly ball type linkage connects the friction member 128 to the nut 123 and includes a link 132 pivoted on the nut at 133 and formed with a concentrated mass at 134. A second link 136 is pivoted to the friction member at one end and to the concentrated mass at 138 at the other end. As the nut rotates the concentrated mass 134 tends to be thrown radially outward by the centrifugal force and this in turn results in a reaction which applies an axial force pulling the friction member 128 toward the nut 123. A stationary brake member 139 is mounted in the body 115 and provided with a friction shoe 141 which is adapted to be engaged by the radially extending flange 142 on the nut 123.

In operation axial movement of the plunger 116 is converted into a larger rotational movement of the nut 123. This in turn causes the concentrated mass 134 to create a centrifugal force which is converted into axial force operating on the friction member 128 urging it into engagement with the friction shoe 141. Since axial motion by the friction member 128 is impossible after the friction member 128 engages the friction shoe 141, the axial force between the friction shoe 141 and the friction member 128 and in turn the frictional resistance to rotation will be proportional to the centrifugal force of the concentrated mass 134 which is porportional to the square of the velocity of rotation. By adjusting the proportions of the links 132 and 136 and the weight of the mass 134, it is possible to easily adjust the frictional reaction force to any desired value for a given velocity but once this value has been established the frictional resistance at other velocities will follow a square function relationship. Here again a relatively small friction reaction operates through a large distance so it may be utilized to control much larger forces acting through smaller distances.

Figure 9A:
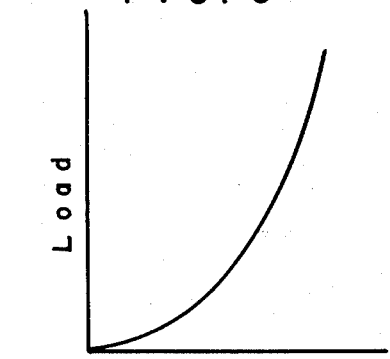
Figure 9a is the load velocity curve of the shock absorber shown in Figure 9.

Figure 9a is a load velocity curve for the shock absorber shown in Figure 9 and illustrates the fact that the load resistance of the shock absorber is proportional to the square of the velocity.

Figure 10:
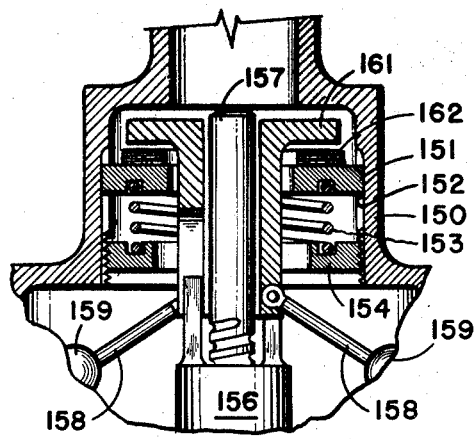
Figure 10 is a fragmentary longitudinal section of a modification of the shock absorber shown in Figure 9 provided with spring loaded friction shoes.
Figure 10A:
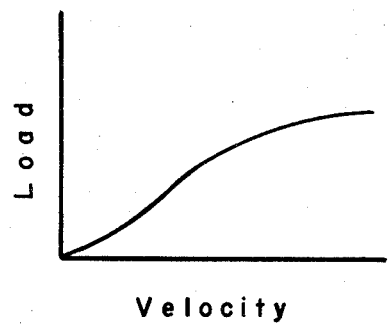
Figure 10a is a load velocity curve for the shock absorber shown in Figure 10.

Figure 10 shows a modification of the basic type of shock absorber shown in Figure 9 wherein the ball screw and nut is utilized along with the fly ball type force converting means. In this embodiment, however, a body 150 is provided with a spring biased non-rotatable brake member 151 attached to the body 150 by means of a spline connection at 152. A spring 153 is utilized to resist axial motion of the non-rotatable brake member downwardly as shown in Figure 10. This spring abuts against the brake member 151 at one end and against a spring retainer 154 at the other end. The nut 156 is connected to the screw 157 by means of antifriction bearings in the same manner as the embodiment shown in Figure 9 and the links 158 are connected to a concentrated mass 159 so that the centrifugal forces of the mass 159 create axial forces on the friction member 161 which cause it to move toward the brake member 151. As the axial force on the friction member 161 increases, the brake member 151 moves axially downward compressing the spring 153 and the reaction force between friction material 162 and the friction member 161 is determined by the amount of compression on the spring 153. However, the position to which the spring is compressed is determined by the centrifugal force on the concentrated mass 159 and the position of the links 158. The load velocity curve for such a device is illustrated in Figure 10a. It should be understood that changes of any of the proportions such as the mass of the weight 159, the length of the links 158, the rate of the spring 153 will modify the curve shown in Figure 10a. However, the resulting curve would be of the same family of curves. For purposes of this case this family of curves will be hereafter called the modified curve. Those skilled in the art will recognize that by use of the structure disclosed in Figure 10, it is possible to produce a reaction force pattern in the shock absorber which is related to the velocity of operation in almost any desired way by properly proportioning the various elements.

Figure 11:
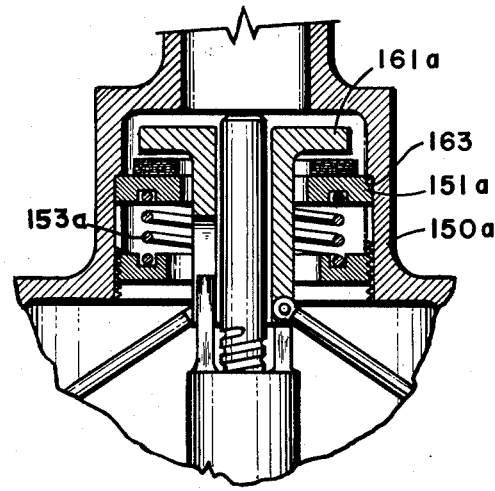
Figure 11 is a fragmentary longitudinal section of a modification of the shock absorber shown in Figure 9 combining the characteristics of the shock absorber shown in Figures 9 and 10.
Figure 11A:
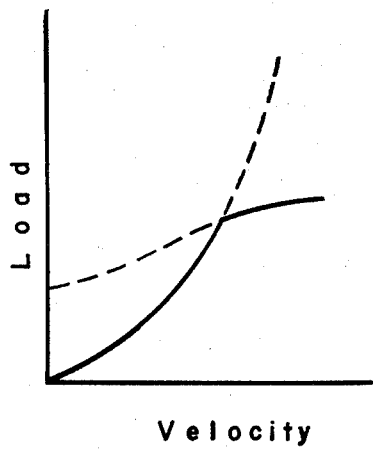
Figure 11a is a load velocity curve for the shock absorber shown in Figure 11.

In the modification shown in Figure 11 the structure is identical to the structure in Figure 10 except that a stop 163 is provided on the body 150a to limit the upward travel of the brake member 151a and the spring 153a is proportioned to be compressed to a substantial degree when the brake member 151a is against this stop. When this structure is utilized the friction reaction is proportional to the square of the velocity as long as the brake member 151a is in engagement with the stop 163 so the load velocity curve follows a square curve at lower values of velocity. When the axial force on the friction member 161a is sufficient to move the brake member 151a away from the stop 163, the load velocity curve will change to the family designated as modified curves. With reference to Figure 11a, those skilled in the art will recognize that by utilizing this structure it is possible to design a shock absorber wherein the relationship between the velocity and the load will follow a square relationship until a predetermined point is reached after which it will follow an entirely different curve; namely, the modified curve.

Figure 12:
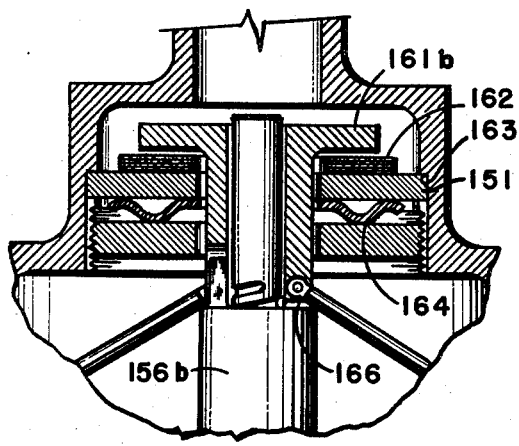
Figure 12 is a fragmentary longitudinal section of modification of the shock absorber shown in Figure 9 having means to limit the maximum effect of velocity.

If it is desired to limit the maximum frictional reaction regardless of velocity, a structure of the type disclosed in Figure 12 should be utilized wherein the brake member 151b is urged upward against a stop 163b by a strong spring 164. In this case the friction member 161b is provided with a second stop 166 slightly spaced from the nut 156b when the brake member 151b is in engagement with the stop 163b. After the axial force due to the centrifugal motion operating on the friction member 161b is sufficiently large to overcome the preload of the spring 164, the stop 166 will engage the end of the nut 156b and prevent additional motion of the friction member 161b toward the nut 156b. It is, therefore, apparent that since the frictional force between the friction material 162b and the friction member 161b is determined only by the compression of the spring 164 and since further motion of the friction member 161b is impossible, the maximum frictional reaction is reached when the stop 166 engages the nut 156b.

Figure 12A:
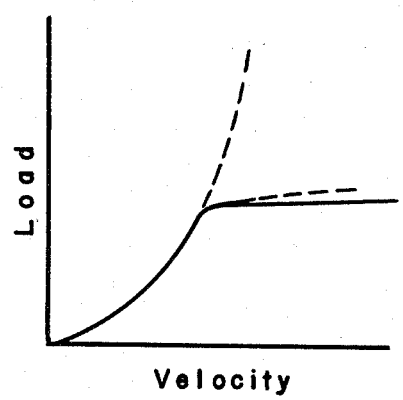
Figure 12a is the load velocity curve for the shock absorber shown in Figure 12.

The load velocity curve of this mechanism is shown in Figure 12a wherein the low velocity portion of the curves follows the square curve until the brake member 151b leaves the stop 163b. The curve will then follow a modified curve until the stop 166 engages the nut 156b after which the curve will assume a constant load value regardless of the increased velocity of the nut. This structure limits the maximum frictional resistance while providing friction proportional to the square of the velocity in the ranges below the maximum.

Figure 13:
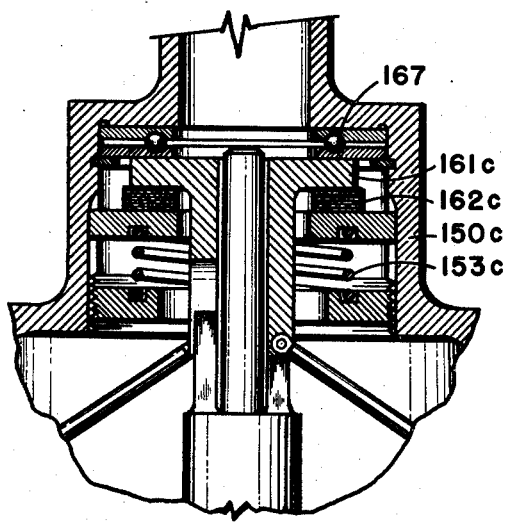
Figure 13 is a fragmentary longitudinal section of another modification of the shock absorber shown in Figure 9 having means to limit the minimum frictional resistance; and, Figure 13a is the load velocity curve for the shock absorber shown in Figure 13.
Figure 13A:
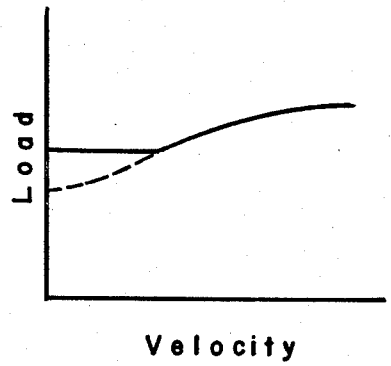

In the embodiment shown in Figure 13 the structure is similar to the structure shown in Figure 10. However, in this case an antifriction stop bearing 167 is located between the friction member 161c and the body 150c. The spring 153c is proportioned to be somewhat compressed when the elements are in the position shown with the friction member 161c in engagement with the stop bearing 167. In this structure the minimum axial force between the friction member 161c and the friction material 162c is determined by the preload of the spring 153c. This minimum value is maintained in the lower range of velocity until sufficient force is exerted on the friction member 161c to move it away from the stop bearing 167. When this predetermined velocity is reached, the velocity curve takes on the characteristics of a modified curve. Reference to Figure 13a shows the load velocity curve for this structure wherein a constant reaction load is achieved until a predetermined velocity is reached after which a modified load curve results.

In all of the above described structures the plunger is restrained against rotation relative to the shock absorber body by the aircraft strut elements as shown in Figure 1; however, if the structure of the strut should make this difficult, splines or other conventional means could be used between the plunger and shock absorber body to resist relative rotation.

Those skilled in the art will recognize that a large number of variations of the shock absorber incorporated in this invention are disclosed making it possible to achieve easily any reactionary effect and that the various modifications may be combined in many ways still keeping within the scope of this invention. In all cases the reactionary force of the shock absorber is arranged to travel through a large distance so as to control an applied force which travels through a relatively small distance so that small reactionary forces may be utilized to control very large actuating forces.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described a body, a first element rotatably movable and axially fixed relative to said body, a second element axially movable and rotatably fixed relative to said body, motion translating means between said elements, a first brake surface rotatably fixed relative to said first element, a second brake surface rotatably fixed relative to said body, and radially movable brake actuating means connected to one of said surfaces operable to provide a force of engagement between said surfaces which is a function of the rotational velocity of said first element.

2. In a device of the character described a body, first and second co-operating screw threaded elements, antifriction members interconnecting said elements whereby axial motion between said elements effects rotational motion therebetween, said first element being rotatably fixed and axially movable relative to said body and said second element being axially fixed and rotatable movable relative to said body, a first brake surface rotatably fixed relative to said second element, a second brake surface rotatably fixed relative to said body, and radially movable means operably connected to one of said brake surfaces operable to produce a force of engagement therebetween which is a function of the rotational velocity of said second element.

3. In a device of the character described a body, a first element rotatably movable and axially fixed relative to said body, a second element axially movable and rotatably fixed relative to said body, motion translating means between said elements, a brake shoe on said first element rotationally fixed relative thereto adapted to engage said body and resist relative rotation therebetween, and radially movable inertia means operably connected to said brake shoe producing a force of engagement between said brake shoe and body which is a function of the rotational velocity of said first element.

4. In a device of the character described a body, a first element rotatably movable and axially fixed relative to said body, a second element axially movable and rotatably fixed relative to said body, motion translating means between said elements, a radially movable brake shoe rotatably fixed on said body having an arcuate brake surface substantially parallel to said second element, said body formed with a stationary brake surface engageable by said arcuate surface, the rotation of said brake shoe with said first element producing a force of engagement between said surfaces which is a function of the rotational velocity thereof.

References Cited in the file of this patent
UNITED STATES PATENTS

| | | |
|---|---|---|
| 893,680 | Watres | July 21, 1908 |
| 1,044,188 | King | Nov. 12, 1912 |
| 1,654,763 | Tauscher | Jan. 3, 1928 |
| 1,933,768 | Siqveland | Nov. 7, 1933 |
| 2,346,667 | Dowty | Apr. 18, 1944 |
| 2,471,857 | Bleakney et al. | May 31, 1949 |